Aug. 28, 1928.  1,682,206
L. K. WHITCOMB, JR., ET AL
HYDRAULIC GATE
Filed Jan. 20, 1926   3 Sheets-Sheet 3

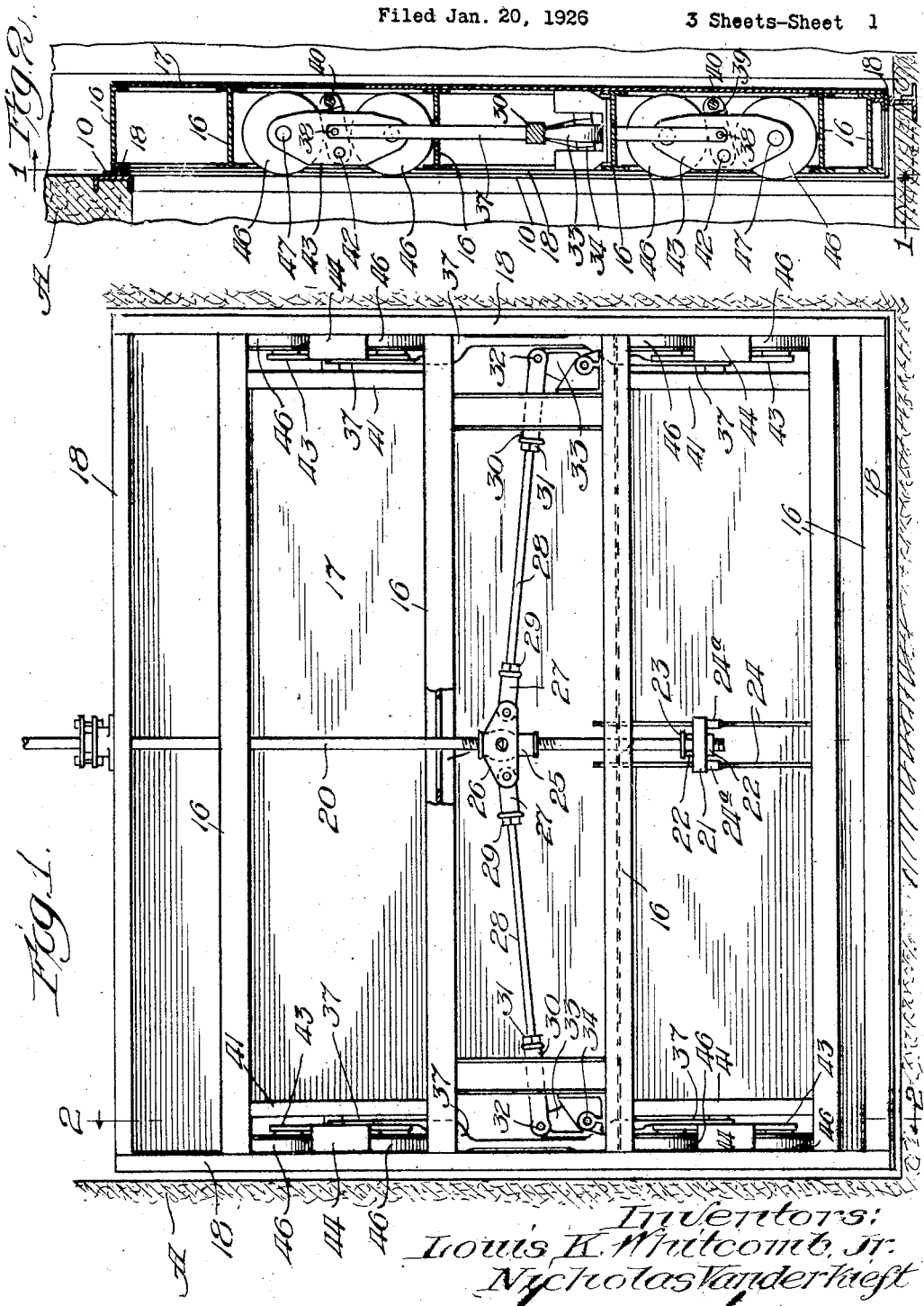

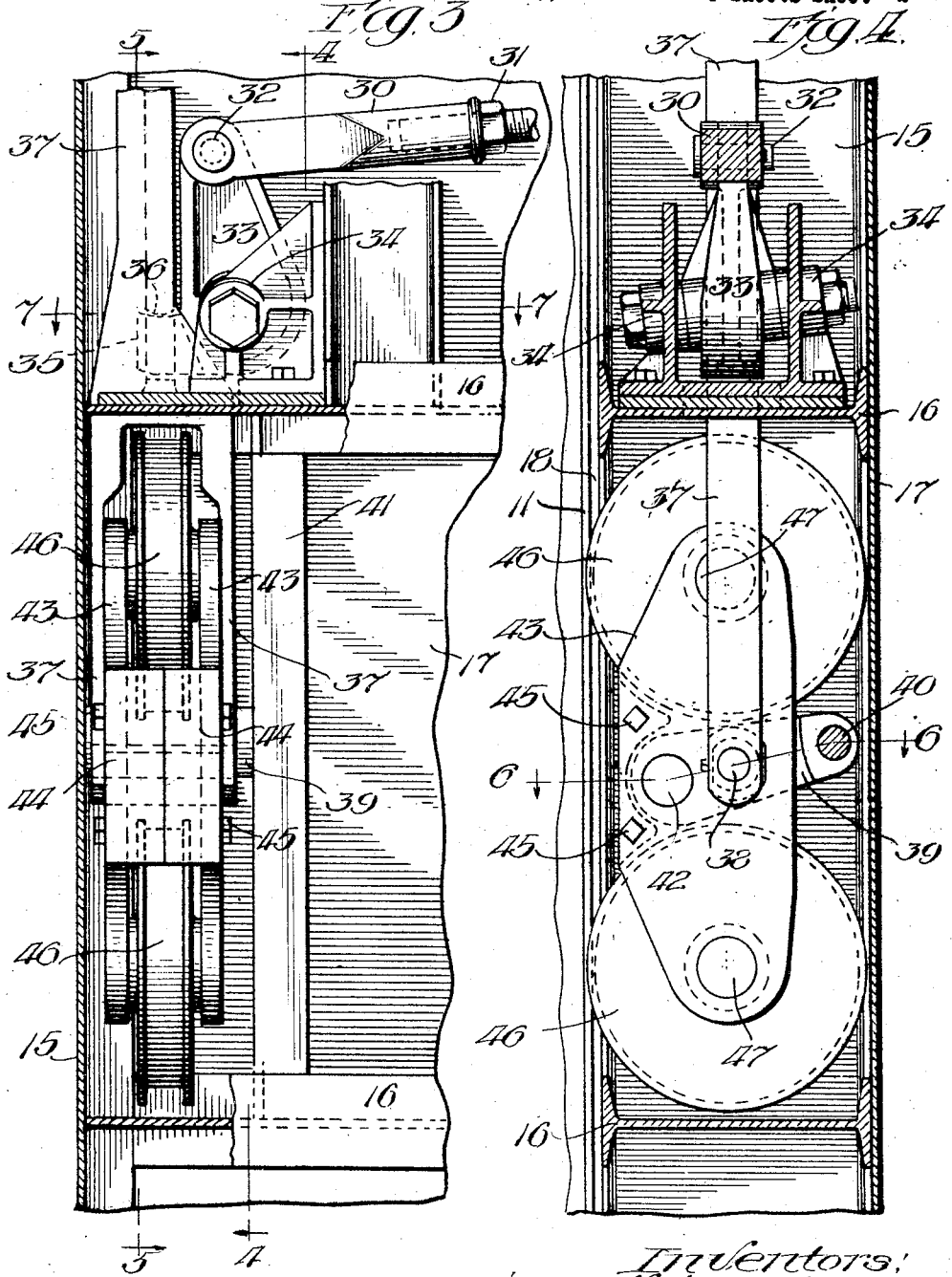

Inventors:
Louis K. Whitcomb, Jr.
Nicholas Vanderkieft
by Ohmer & Ohmer
Attys

Patented Aug. 28, 1928.

1,682,206

UNITED STATES PATENT OFFICE.

LOUIS K. WHITCOMB, JR., AND NICHOLAS VANDERKIEFT, OF CHICAGO, ILLINOIS.

HYDRAULIC GATE.

Application filed January 20, 1926. Serial No. 82,475.

This invention relates to hydraulic gates, a type of valve which may be used to advantage in controlling the flow of water from reservoirs of various kinds, such, for example, as penstocks leading to water wheels in power installations.

The vertical movements of a hydraulic gate require the application of considerable power to overcome the friction between the gate and its seal due to the unbalanced water pressure on the gate. To reduce as much as possible the friction thus occurring between the gate and its seal, it is here proposed to employ means which develop unlimited capacity through the application of a force to the gate mechanism, not greater than the weight of the gate, for effecting unsealing thereof; and also to employ anti-friction means whereon to carry the gate during certain lateral and vertical movements, the sealing faces being in contact only when the gate is closed. The mechanism for such purpose is usually objectionable on account of complexity, size, undue space required for its accommodation, inefficient application of the forces by which movements are imparted to the gate, undependability in operation, inadaptability for use with many types of hydraulic structures, non-portability, high initial cost and upkeep, and inability to produce a seal which is satisfactory in every respect. It is accordingly an object of this invention to improve upon these particulars in a manner whereby the operating mechanism may be simplified, be adaptable to ordinary sliding friction type gates, be confined to a small portion of the space within the gate, and require for its effective movement the application of a force from some source of power, considerably less than heretofore used. In various other respects also, as will fully hereinafter appear, the present hydraulic gate is distinctly advantageous.

An illustrative embodiment of this invention is set forth in the accompanying drawings in the manner following:

Figure 1 which is a vertical section taken on line 1—1 of Fig. 2, shows in elevation the inner face of the sealing side of the present gate;

Fig. 2 is a tranvesrse section through the gate, taken on line 2—2 of Fig. 1;

Fig. 3 is an enlarged detail of certain operating parts adjacent one gate end, the view being mostly in elevation;

Fig. 4 is a similar view taken on line 4—4 of Fig. 3;

Figure 5:
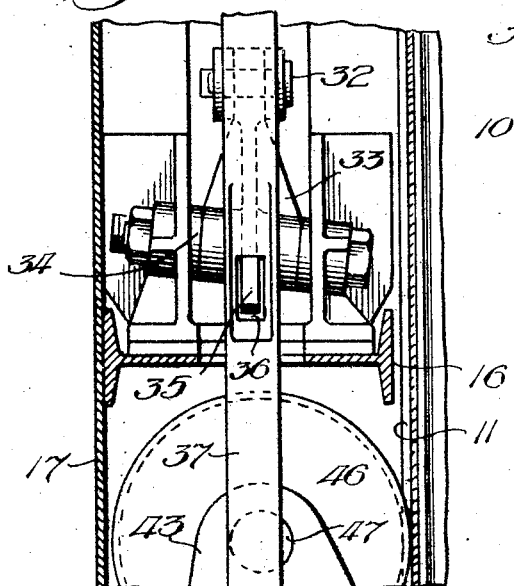
Fig. 5 is a sectional detail on line 5—5 of Fig. 3.
Figure 6:
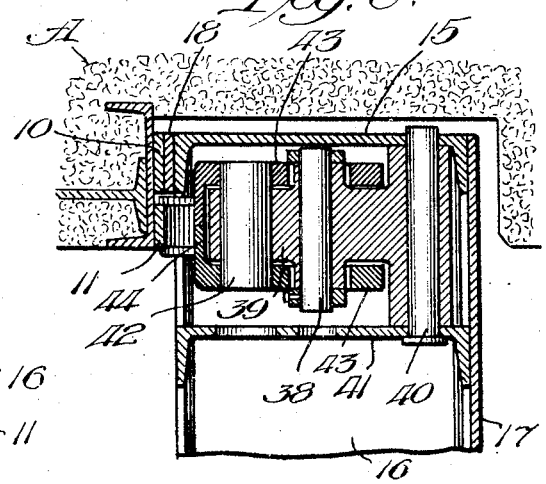
Fig. 6 is a sectional detail taken on line 6—6 of Fig. 4.
Figure 8:
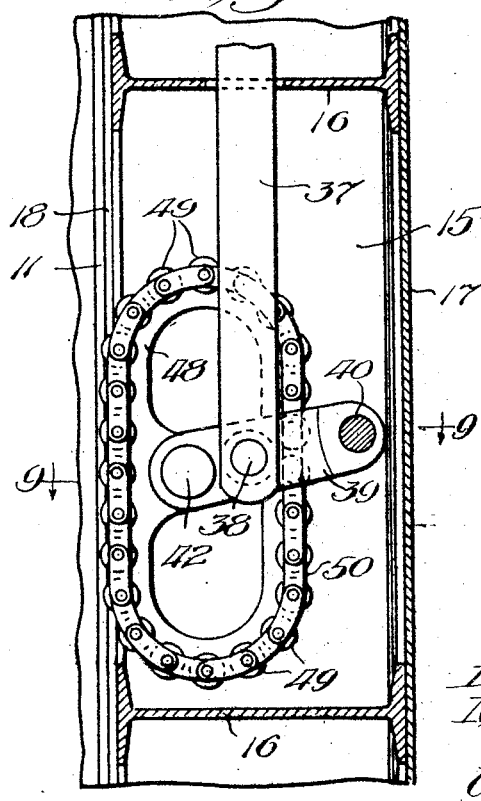
Figure 7:
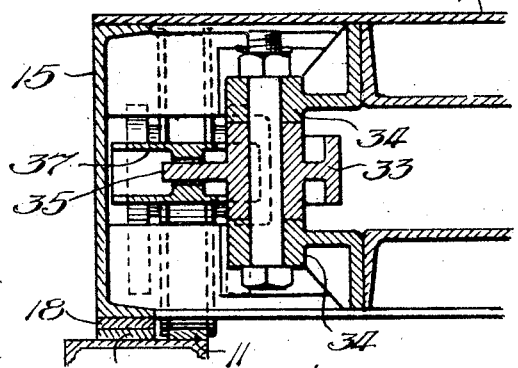
Fig. 7 is a detail in section on line 7—7 of Fig. 3.
Figure 9:
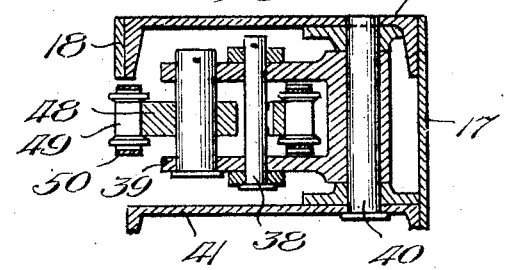

Fig. 8 which is a view generally similar to Fig. 4, shows a modification of the anti-friction means; and Fig. 9 is a transverse section therethrough on line 9—9.

A hydraulic gate of the kind herein contemplated may be vertically slidable within a channeled guideway provided in a wall or abutment A, to which are affixed sealing strips 10 of bronze or other metal non-corrosive in water. Adjacent the strips may be placed rails 11 whereon certain wheels or rollers travel when the gate is moved into or out of position. The illustrative gate structure comprises end channel irons 15 connected at their tops and bottoms and intermediately by cross beams 16 having a suitable sectional form. A plate 17 covers the water side of the gate so as to prevent passage of liquid therethrough, and around the margins of the opposite gate side are sealing strips 18 so disposed as to rest against the sealing strips 10 whereby to form therewith a watertight joint.

The operating mechanism for the present gate which is located within the space of its own width may conveniently employ the lever and toggle principle. As shown, it comprises a vertical lifting rod 20 which extends from above the top of the gate through several of the cross beams thereof. To the upper end of the rod the force necessary to operate the mechanism is applied. At its lower end is carried a head 21 adjustably secured thereon as by lock nuts 22, a stop plate 23 being associated with the upper nut to engage with the under side of the proximate cross beam when the lifting rod is raised sufficiently for this purpose. A pair of fixedly mounted guide rods 24 may pass through opposite sides of the head whereby to steady its vertical movements, adjustable stops 24ª being fastened to these rods whereby to limit the downward movement of the lifting rod 20.

At a point of higher elevation upon the lifting rod is adjustably supported a collar 25 which affords a pivotal mounting for an equalizing toggle head which may consist of a pair of companion bars 26 between the opposite ends of which are pivoted socket members 27 within each of which is adjustably received a tension rod 28 secured fast with the aid of a lock nut 29. The opposite end of each tension rod is similarly connected to a second socket member 30 with which may be associated a lock nut 31. The screw threads at the opposite ends of the tension rods may be reversely inclined whereby the distance between the connected socket members may be varied with rotation of these rods. A pivotal connection 32 is made between each socket member 30 and the vertically disposed arm of a bell crank 33 which is fulcrumed for rocking movement within a bearing member 34. A laterally extending arm 35, forming part of each bell crank, is disposed within a slot 36 formed in a vertical connecting bar 37 of which one is located adjacent each end of the gate. At its upper and lower ends each bar 37 makes pivotal connection, as at 38, with a lever 39 which is fulcrumed at one end upon a pin 40 which extends between the gate end and a strut 41. As the horizontal projection of the distance between each connecting bar and fulcrum points 40 varies with movements of the former in response to actuation of the bell cranks, the axes of the latter are preferably inclined, as shown, whereby their lateral arms 35 move in substantially conformity with the travel of the connecting bars, sliding friction between these parts being obviated in this manner.

A pivotal connection is made as at 42 between the opposite end of each lever and an equalizing truck, the construction of which appears best in Figs. 3 and 4. As shown, each truck may comprise a pair of companion truss plates 43 spaced apart, as by flanges 44 for the purpose of assembly, and connected in unitary relation as by means of bolts 45. Each end of the two connecting bars 37 may be forked whereby to straddle the trucks, the pins 38 passing through slots therein to connect with the levers 39 which are disposed between the two truss plates.

Mounted in each truck is a pair of wheels 46 one at each end thereof, and each rotatable upon a pin 47. The peripheries of these wheels are desirably flanged so as to guide the gate along the rails 11 when the same is vertically moved. It is, of course, feasible to vary the character of the wheels or rollers used, a suggestive modification for this purpose being shown in Figs. 8 and 9. In these we have illustrated a truck 48 having a mounting similar to that already described, but formed to provide a raceway around which may travel a plurality of grooved rollers 49 interconnected by links 50. As this is simply an alternative form of anti-friction device for producing similar results, further description thereof should not be necessary, it being understood, however, that the term "wheel," as used hereinafter, is intended to cover rollers as well.

To raise the gate a lifting force is applied to the upper end of the rod 20. The equalizing toggle head is thereby raised to rock both bell cranks and thereby elevate the two connecting bars 37. The levers connected to each of these bars are thereupon raised a slight distance, the center of these movements being the lever fulcrums 40. The adjustment of the vertical connections may be such as to complete the lever movements before the truck pins 42 have reached the same elevation as the fulcrum points 40 of the levers 39 whereby these levers remain in such a position that the vertical component of the unbalanced water pressure, as transmitted through the levers and acting upon the pins 42, has a moment sufficient to overcome the friction of the mechanism and seal the gate when the force applied to the lifting rod 20 has been released. The stop plate 23, when brought into engagement with the associated cross beam, will arrest all further movements through the toggle and lever connections. Until the plate 23 engages the cross beam no vertical movement of the gate takes place, but in response to a continuation of the lifting force applied to the lifting rod 20, after the plate 23 has engaged the adjacent cross beam, the gate moves vertically as a unit. Through the movements just described, before the stop plate 23 is engaged, the several wheels are simultaneously pressed against the rails, and the gate is thereby forced laterally from its seal. By first shifting the gate from its seal, the lifting force thereafter required for raising of the gate need only be equal to the weight of the gate plus the slight force necessary to overcome the friction in the wheels or rollers which are used.

The replacement of the gate follows a procedure just the reverse of that which has been described. Until the gate has reached its bottom position, the wheels prevent contact between the gate and its seal, thereby eliminating the sliding friction between the gate and its seal. When the bottom position has been reached, however, the forces working through the toggle and lever connections are relaxed to permit the trucks to move downwardly whereby the gate shifts to a sealing position in response to the water pressure.

It has been proposed heretofore to shift a hydraulic gate laterally from its seal upon anti-friction means, preliminary to any vertical movement. Our invention goes further than this, however, in that the gate combines in its structure an operating mechanism which utilizes to the greatest advantage the lifting force which is required. This part of our invention will now be touched upon.

It is to be noted that we employ a balanced construction for several of the operating components. From the toggle head 26 an equalized force is transmitted to the several trucks each of which is balanced upon its associated lever 39. The tension produced in the rods 28 through lift of the toggle head 26 is converted to a vertical force in the connecting rods 37 at the points of their engagement with the bell cranks. The equal and opposite reaction of this vertical force is thrown into the gate at the fulcrum points 34 of the bell cranks 33. This reaction being opposite to the force imparted by the bell cranks to the connecting bars, it tends to push down on the gate, and together with the weight of the gate (minus the vertical component of the force in the tension arms 28) prevents the gate from lifting until the stop plate 23 strikes against the associated cross beam.

The vertical forces in the connecting bars 37 cause the levers 39 to rock upon their fulcrums 40. Each lever is disposed at an angle less than 90 degrees relative to the vertical, so that rotation of the bell cranks sets up a compression in the levers which causes pressures to be exerted at the points 42 upon the several trucks. The force at these points is equally distributed to the wheels which press against immovable guide rails. Therefore the lever fulcrums which are fastened to the gate, are forced back from the rails and counter to the water pressure. The entire gate is thus shifted from the rails so as to break the seal and transfer equally to the wheels the horizontal force due to pressure of water against the gate. As previously stated, all this motion takes place before the gate begins to rise. The actual lift of the gate takes place only after the stop plate 23 engages with the cross beam in response to continued upward movement of the rod 20; and when the gate does commence to rise, the entire horizontal water pressure is sustained by the wheels 46.

Due to the fact that the bell cranks, or other devices for gaining mechanical advantage and changing the direction of the vertical lifting force, are fulcrumed on the gate, and that at the fulcrum points 34 the reaction of the lifting force on the connecting rods 37 is equal and opposite, an increased downward force equal to the lifting force is added to the weight of the gate. All this tends to aid in unsealing the gate. The balanced mounting of the wheels is such that each sustains an equal load at all times. Also because the lengths of the tension rods 28 may be adjusted, the angle of the toggle joint can be changed, so as to obtain more or less mechanical advantage of the mechanism, as desired.

On account of such features as these, it is possible to adapt the present gate advantageously to different conditions of use.

We claim:

1. In combination with a seat, a sliding gate valve, a balanced mounting carried on the gate, means for shifting said mounting laterally of the gate, and anti-friction devices supported by said mounting adapted to bear against the seat, substantially as described.

2. A hydraulic gate with which is associated means for forming a seal against a wall, means bearing against the wall having a balanced mounting on the gate, and equalized tension means working through lever and toggle connections for shifting said mounting laterally of the gate whereby to press against the wall, substantially as described.

3. In a hydraulic gate, the combination of a vertically movable lifting rod, adjustable stop means whereby the range of rod movement may be controlled, a balanced toggle head supported on the rod, tension rods extended oppositely from the toggle head, a bell crank to which each tension rod is connected, and means operated by each bell crank and bearing against the wall for shifting the gate therefrom counter to an opposing water pressure, substantially as described.

4. A hydraulic gate in which is combined a vertically movable lifting rod, equalized toggle connections extending therefrom, a pair of bell cranks adapted to be moved by said toggle connections, and means in connection with the bell cranks bearing against a wall adapted to exert a horizontal force against the gate whereby the position of the gate may be varied with respect to the wall, substantially as described.

5. In a hydraulic gate, the combination of a pair of wheels at each end thereof, a separate mounting for each pair of wheels, a common rod connecting the two mountings at each end of the gate in a manner whereby the mountings are balanced thereupon, lever and toggle connections extending from said connecting rod, and a lifting rod joined to said toggle connections whereby to convert a vertical force into a horizontal force acting upon all the wheel mountings, substantially as described.

6. In a hydraulic gate, the combination with a balanced mounting of a pair of wheels adapted to bear with an equalized pressure against an immovable support, a vertically movable lifting rod, and connections from the rod to the wheel mountings such that the latter is moved in response to actuation of the former, whereby a horizontal force is directed against the gate to shift the same from the support, substantially as described.

7. The combination with a sliding gate valve having plural sets of wheels at each end thereof, on which it travels, of balanced mountings, one for each set of wheels, and means, including an equalizing device, interconnecting all of said wheel mountings in a manner whereby to shift the valve laterally thereof, the position of the gate with respect to its seat being thereby varied, substantially as described.

8. In combination with a seat, a sliding gate valve, means including toggle and lever connections for unseating the gate including means whereby to change the mechanical advantage of said connections in accordance with the force required for unsealing the gate under different operating heads, substantially as described.

9. In combination with a seat, a sliding gate valve having at the ends thereof wheels which bear upon the seat, balanced mountings for the wheels, a toggle and lever mechanism adapted to shift the valve laterally with respect to the wheel mountings whereby to vary the position of the valve with respect to its seat, said mechanism including means whereby to change the mechanical advantage of said mechanism in accordance with the force required for unseating the gate under different operating heads, substantially as described.

10. In combination with a seat, a sliding gate valve, plural balanced means bearing on the seat and movably carried by the gate, and operating mechanism therefor including a vertical lift rod and levers connected therewith so disposed as to transmit to the several means an equalized horizontal force with a vertical action which opposes initial lifting of the gate, substantially as described.

11. In combination with a seat, a sliding gate valve, a plurality of lever means connected with the gate valve and bearing against the seat, and a toggle mechanism interconnecting such lever means adapted to operate the latter whereby the gate is shifted toward or from the seat, substantially as described.

12. A gate with which is associated means for forming a seal against a wall, a pair of balanced mountings movable laterally of the gate, anti-friction means carried in each mounting, means connecting the two mountings, and a toggle mechanism linked to said connecting means and adapted to transmit therethrough a force which moves the balanced mountings laterally of the gate, substantially as described.

13. The combination with a sliding gate valve having a seat, of wheels at the valve ends bearing against an immovable support, balanced mountings for the wheels, and means to shift the valve laterally with respect to the wheel mountings whereby the wheels exert an equalized pressure on the support to vary the position of the valve with respect to its seat, substantially as described.

14. The combination with a sliding gate valve having a plurality of wheels at each end thereof, on which it travels, of balanced mountings for the wheels at each gate end, and means exerting through the mountings an equalized force adapted to shift the gate laterally with respect to its seat, substantially as described.

15. The combination with a sliding gate valve having wheels at the ends thereof, on which it travels, of balanced mountings for the wheels, and means exerting through the mountings an equalized force adapted to shift the gate laterally with respect to its seat, substantially as described.

16. In combination with a seat, a sliding gate valve, means carried by the valve for bearing against the seat, and operating mechanism including a lever device connected with said means adapted to exert upon the lever device an upward force while exerting upon the gate a downward force which opposes initial lifting movement of the gate, substantially as described.

NICHOLAS VANDERKIEFT.
LOUIS K. WHITCOMB, Jr.